United States Patent
Wui (10) Patent No.: US 10,440,904 B2
(45) Date of Patent: Oct. 15, 2019

(54) DRIP EMITTER

(71) Applicant: SGT CO., LTD., Suncheon, Jeollanam-do (KR)

(72) Inventor: Kay Dae Wui, Jeollanam-do (KR)

(73) Assignees: SGT CO., LTD., Suncheon, Jeollanam-do (KR); Kay Dae Wui, Suncheon, Jeollanam-do (KR); Hwan We, Suncheon, Jeollanam-do (KR)

( * ) Notice: Subject to any disclaimer, the term of this patent is extended or adjusted under 35 U.S.C. 154(b) by 0 days.

(21) Appl. No.: 15/491,527

(22) Filed: Apr. 19, 2017

(65) Prior Publication Data

US 2018/0303047 A1  Oct. 25, 2018

(51) Int. Cl.
*G05D 7/01* (2006.01)
*A01G 25/02* (2006.01)

(52) U.S. Cl.
CPC .............. *A01G 25/023* (2013.01); *G05D 7/01* (2013.01); *G05D 7/0186* (2013.01); *Y02A 40/237* (2018.01)

(58) Field of Classification Search
CPC ........................... A01G 25/023; G05D 7/0186
USPC ......................................................... 239/542
See application file for complete search history.

(56) References Cited

U.S. PATENT DOCUMENTS

| | | | | |
|---|---|---|---|---|
| 3,815,636 A | * | 6/1974 | Menzel | A01G 25/023 137/504 |
| 4,254,791 A | * | 3/1981 | Bron | A01G 25/023 137/118.04 |
| 4,715,543 A | * | 12/1987 | Rinkewich | A01G 25/023 239/542 |
| 4,824,025 A | * | 4/1989 | Miller | A01G 25/023 239/542 |
| 4,856,552 A | * | 8/1989 | Hiemstra | F16L 55/02736 137/497 |
| 4,971,253 A | * | 11/1990 | Lazarus | A01G 25/023 138/43 |
| 5,111,996 A | * | 5/1992 | Eckstein | A01G 25/023 239/542 |
| 5,236,130 A | * | 8/1993 | Hadar | A01G 25/023 239/542 |
| 5,330,107 A | * | 7/1994 | Karathanos | A01G 25/023 239/533.1 |
| 6,945,476 B2 | | 9/2005 | Giuffre | |
| 7,108,205 B1 | | 9/2006 | Hashimshony et al. | |

(Continued)

FOREIGN PATENT DOCUMENTS

CN   103623947 A   3/2014
CN   204217596 U   3/2015
(Continued)

OTHER PUBLICATIONS

International Search Report and Written Opinion dated Feb. 8, 2019 in corresponding PCT application No. PCT/IB2018/000508.

*Primary Examiner* — Chee-Chong Lee
(74) *Attorney, Agent, or Firm* — Mintz Levin Cohn Ferris Glovsky and Popeo, P.C.; Kongsik Kim; Jhongwoo Jay Peck (57) ABSTRACT

A drip emitter has a hollow body provided with first and second pools and with an inlet recess between the first and second pools. The inlet recess has inlet hole(s). The emitter is provided with an elastic band surrounding at least one of the inlet holes. The elastic band, in its closed position, is in a tight contact with the inlet hole(s). In its open position, it is expanded to open the inlet hole(s).

19 Claims, 13 Drawing Sheets

(56) References Cited

U.S. PATENT DOCUMENTS

7,988,076 B2    8/2011   Mamo
8,096,491 B2    1/2012   Lutzki et al.
8,763,934 B2    7/2014   Patel
9,485,923 B2    11/2016   Ensworth et al.

FOREIGN PATENT DOCUMENTS

CN      204350768 U    5/2015
KR      20-0376067 Y1    3/2005
KR      10-1390952 B1    4/2014

\* cited by examiner

FIG. 10

DRIP EMITTER

TECHNICAL FIELD

The present invention relates to drip emitters and tubes comprising the drip emitters.

BACKGROUND ART

There are multiple types of irrigation drip emitters, as disclosed in, for example, U.S. Pat. Nos. 9,485,923, 8,763,934, 8,096,491, 7,988,076, 7,108,205, and 6,945,476. Although currently known drip emitters have some advantages, they have various problems of, e.g., experiencing pressure loss and/or getting clogged. There is still a need for an improved drip emitter.

SUMMARY

An aspect of the present invention provides an irrigation drip emitter. The irrigation drip emitter has a first end, a second end, an outer surface between the first and second ends, and an inner surface between the first and second ends. The irrigation drip emitter comprises a first pool, a first labyrinth fluid flow path, an inlet recess, a second labyrinth fluid flow path, and a second pool. The first and second pools, the first and second labyrinth fluid flow paths, and the inlet recess are defined on the outer surface and are in direct or indirect fluid communication with each other. The irrigation drip emitter further comprises an elastic band that surrounds the inlet access.

Another aspect of the present invention provides an irrigation line tube provided with dripping holes. A plurality of irrigation drip emitters according to embodiments of the present invention are provided in series inside the irrigation line tube such that the dripping holes of the irrigation line tube are positioned above all or some of the first pools of the irrigation drip emitters, all or some of the second pools of the irrigation drip emitters, or both.

The embodiments and other aspects will be discussed in detail below.

DETAILED DESCRIPTION

Hereinafter, embodiments of the present invention will be described in detail with reference to the drawings. It is to be understood, however, that the embodiments are presented for illustrative purpose only and are not constructed to limit the scope of the present invention.

Figure 1:
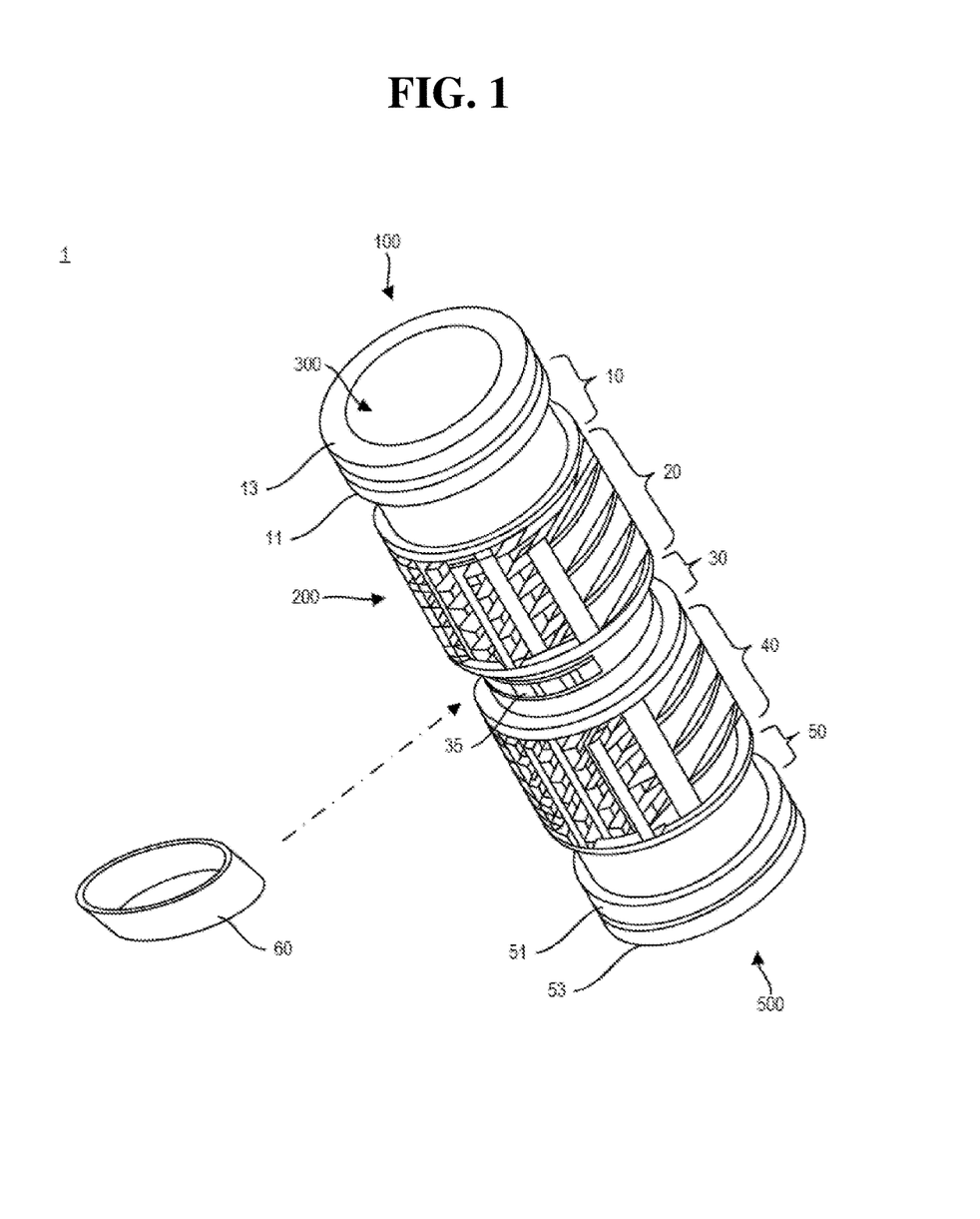
FIG. 1 is a perspective view of an irrigation drip emitter in accordance with an embodiment of the present invention.
Figure 2:
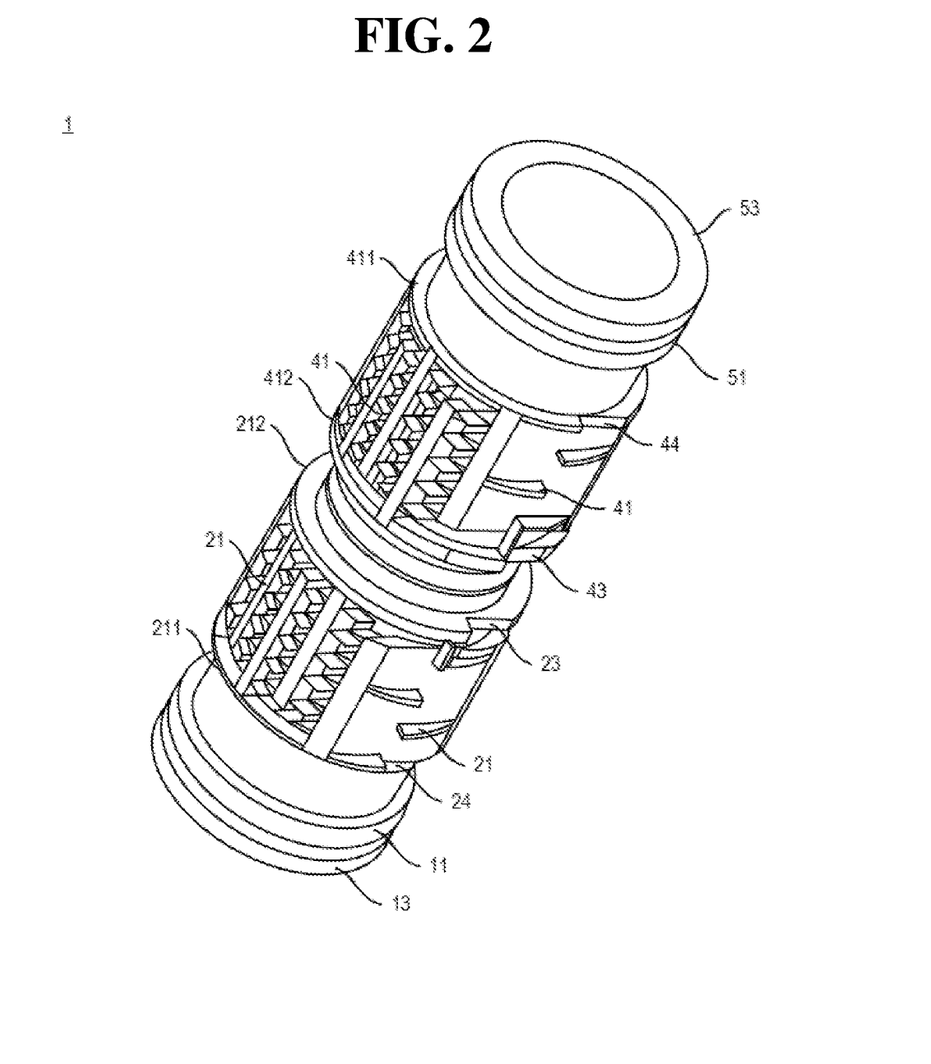
FIG. 2 is another perspective view thereof.

An aspect of the present invention provide an irrigation drip emitter that does not cause the above-described prior art problems (e.g., experiencing pressure loss and/or getting clogged). Referring to FIGS. 1 and 2, an irrigation drip emitter (1) in accordance with an embodiment of the present invention is formed in a hollow body. Although the cross-section of the hollow body of FIGS. 1 and 2 is described to be circular, the shape of the cross-section is not limited thereto. The cross-section of the hollow body can be any shape as long as the purpose of the present invention can be achieved. Non-limiting examples of the cross-sectional shape include a polygonal shape (such as triangular, rectangular, pentagonal, and hexagonal shapes) and a round shape (such as a circular shape). Also, the size of the cross-section can be suitably chosen according to design needs.

The hollow body has a first end (100), a second end (500), an outer surface (200) between the first and second ends (100, 500), and an inner surface (300) between the first and second ends (100, 500). The irrigation drip emitter (1) comprises a first pool (10), a first labyrinth fluid flow path (20), an inlet recess (30), a second labyrinth fluid flow path (40), and a second pool (50). The first and second pools (10, 50), the first and second labyrinth fluid flow paths (20, 40), and the inlet recess (30) are defined on the outer surface (200) of the hollow body. The first and second pools (10, 50), the first and second labyrinth fluid flow paths (20, 40), and the inlet recess (30) are in fluid communication with each other directly or indirectly.

A first end wall (11) is formed on the outer surface (200) at or near the first end (100). A first inner wall (21) is formed on the outer surface (200) between the inlet recess (30) and the first end wall (11). The first labyrinth fluid flow path (20) is defined by the first inner wall (21). The shape, number, and size (e.g., width and height) of the first inner wall can be suitably chosen according to design needs or else. For example, the cross-section of the first inner wall can be a polygonal shape, a round shape, or a mixed shape. For example, two (or more) of the first inner walls can be provided and the first inner walls can be in fluid communication with each other directly or indirectly. A second end wall (51) is formed on the outer surface (200) at or near the second end (500). A second inner wall (41) is formed on the outer surface (200) between the inlet recess (30) and the second end wall (51). The second labyrinth fluid flow path (40) is defined by the second inner wall (41). The shape, number, and size (e.g., width and height) of the first inner wall can be suitably chosen according to design needs or else. For example, the cross-section of the first inner wall can be a polygonal shape, a round shape, or a mixed shape. For example, two (or more) of the second inner walls can be provided and the second inner walls can be director indirect in fluid communication with each other.

The first pool (10) is defined by the outer surface (200), the first end wall (11), and a first end (211) of the first inner wall (21). The second pool (50) is defined by the outer surface (200), the second end wall (51), and a first end (411) of the second inner wall (41). The inlet recess (30) is defined by the outer surface, a second end (212) of the first inner wall (21), and a second end (412) of the second inner wall (41). The inlet recess (30) is provided with one or more inlet holes (35). A fluid (e.g., water) can flow inside the hollow body of the irrigation drip emitter (1). The fluid that flows inside the hollow body can be supplied to the inlet recess (30) through the inlet hole(s) (35). The first pool (10) is in fluid communication with the inlet recess (30) via the first labyrinth fluid flow path (20). The second pool (50) is in fluid communication with the inlet recess (30) via the second labyrinth fluid flow path (40).

The irrigation drip emitter (1) further comprises an elastic band (60). The elastic band (60) is provided in the inlet recess (30) such that the elastic band (60) surrounds at least one of the inlet holes (35). The elastic band (60) is configured to move between a closed position where the elastic band (60) is in a tight contact with the inlet holes (35) to thereby prevent a fluid from flowing through the inlet holes (35) and an open position where the elastic band (60) is expanded by a fluid flowing through the inlet holes (35) to thereby allow the fluid to flow to the inlet recess (30) and then to the first and second labyrinth fluid flow paths (20, 40). The elasticity of the elastic band (60) can be suitably chosen according to design needs.

Figure 3:
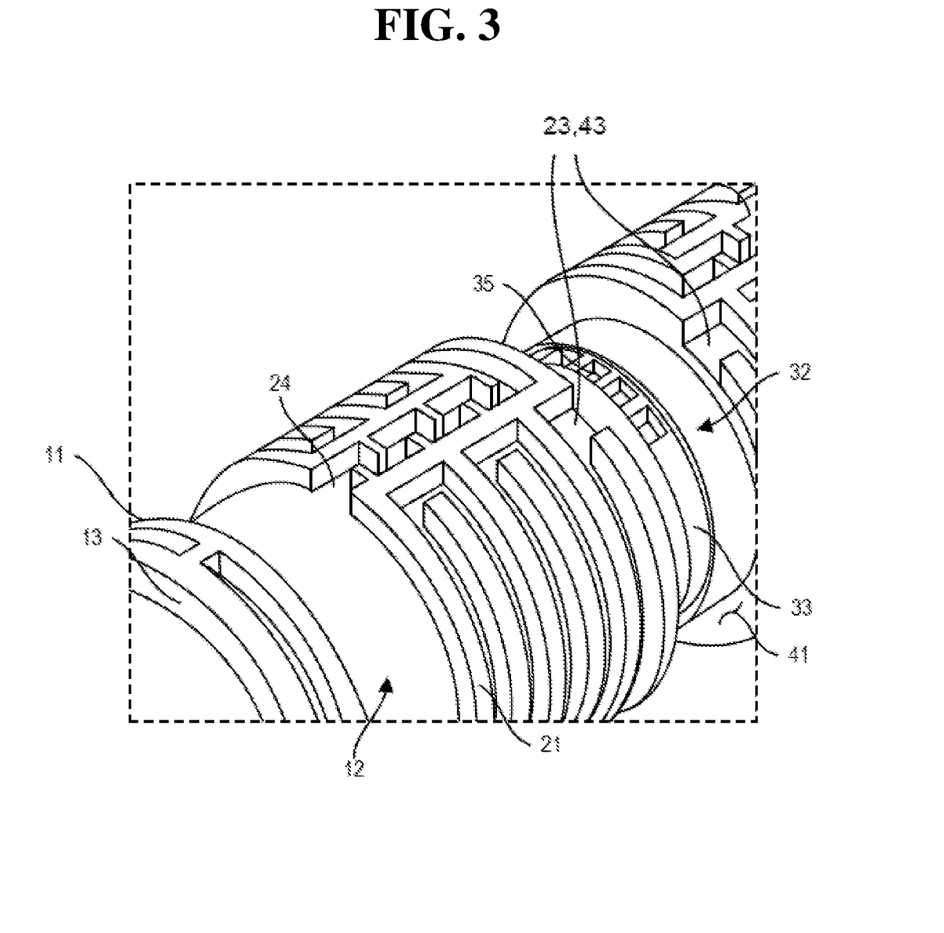
FIG. 3 is a partial, enlarged perspective view of an irrigation drip emitter in accordance with another embodiment of the present invention.
Figure 4A:
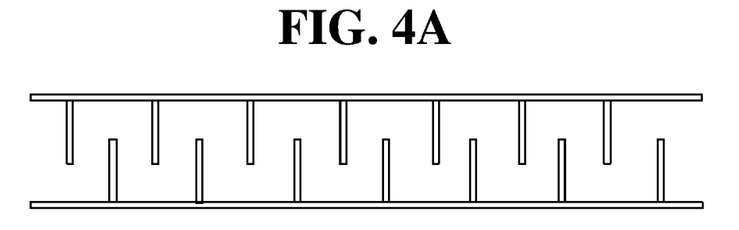
FIG. 4A depicts first and second inner walls of irrigation drip emitters of some embodiments of the present invention.
Figure 4B:
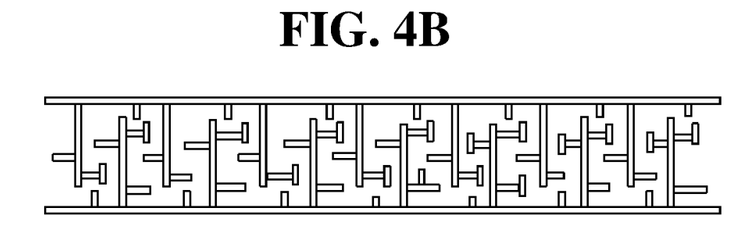
FIG. 4B depicts first and second inner walls of irrigation drip emitters of some other embodiments of the present invention.

In some embodiments, as illustrated in FIG. 3, FIG. 4A, and FIG. 4B, the first inner wall (21) may include one or more horizontal walls, one or more vertical walls, or both. Suitably, at least one of the horizontal walls may further have one or more horizontal sub-walls (or branch walls), one or more vertical sub-walls, or both. Similarly, the second inner wall (41) may include one or more horizontal walls, one or more vertical walls, or both. Suitably, at least one of the horizontal walls may further have one or more horizontal sub-walls, one or more vertical sub-walls, or both.

Figure 4C:
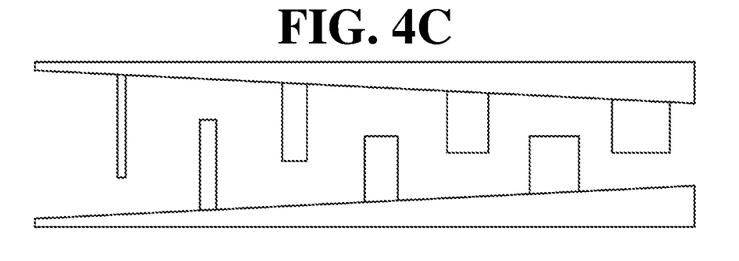
FIG. 4C depicts width of horizontal and vertical fluid paths formed by the horizontal and vertical walls gradually increasing or decreasing in accordance with some embodiments of the present invention.
Figure 4D:
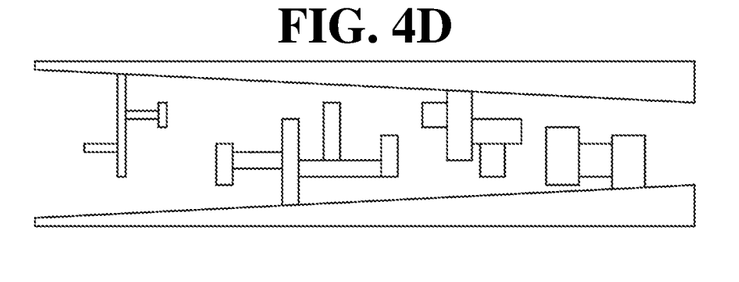
FIG. 4D depicts with width of horizontal and vertical fluid paths formed by the horizontal and vertical sub-walls gradually increasing or decreasing in accordance with some embodiments of the present invention.

In some embodiments, the width of horizontal and vertical fluid paths formed by the horizontal and vertical walls and sub-walls of the first inner wall (21) may be designed to gradually increase or decrease as it goes from the second end (212) of the first inner wall (21) towards the first end (211) of the first inner wall (21). Also, the width of horizontal and vertical fluid paths formed by the horizontal and vertical walls and sub-walls of the second inner wall (41) may be designed to gradually increase or decrease as it goes from the second end (412) of the second inner wall (41) towards the first end (411) of the second inner wall (41).

In some embodiments, the irrigation drip emitter (1) may further comprise an additional first end wall (13) on the outer surface (200) of the hollow body at or near the first end (100) of the hollow body. Similarly, the irrigation drip emitter (1) may further comprise an additional second end wall (53) on the outer surface (200) of the hollow body at or near the second end (500) of the hollow body.

Although it is described in FIGS. 1 and 2 that both the outer surface (200) and the inner surface (300) of the hollow body have a round cross-section, the cross-section of the outer and inner surfaces (200, 300) is not limited to a round cross-section. Non-limiting examples of the cross-sectional shapes include a polygonal shape (such as triangular, rectangular, pentagonal, and hexagonal shapes) and a round shape (such as a circular shape). Also, the cross-section of the outer surface (200) and the cross-section of the inner surface (300) can have different shapes.

As illustrated in FIG. 2 and FIG. 3, the first end (211) of the first inner wall (21) has one or more fluid passages (24). The first pool (10) is in fluid communication with the first labyrinth fluid flow path (20) via the fluid passage(s) (24). The second end (212) of the first inner wall (21) has one or more fluid passages (23). The first labyrinth fluid flow path (20) is in fluid communication with the inlet recess (30) via the fluid passage(s) (23). The second end (412) of the second inner wall (41) has one or more fluid passages (43). The inlet recess (30) is in fluid communication with the second labyrinth fluid flow path (40) via the fluid passage(s) (43). The first end (411) of the second inner wall (41) has one or more fluid passages (44). The second labyrinth fluid flow path (40) is in fluid communication with the second pool (50) via the fluid passage(s) (44).

Figure 5A:
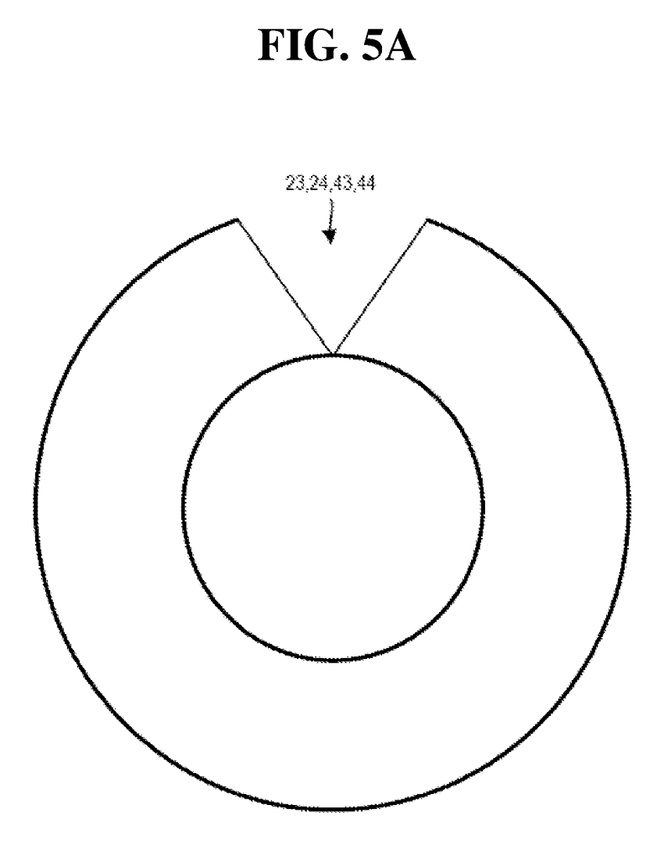
FIG. 5A depicts first and second ends of first and second inner walls of irrigation drip emitters of some embodiments of the present invention.
Figure 5B:
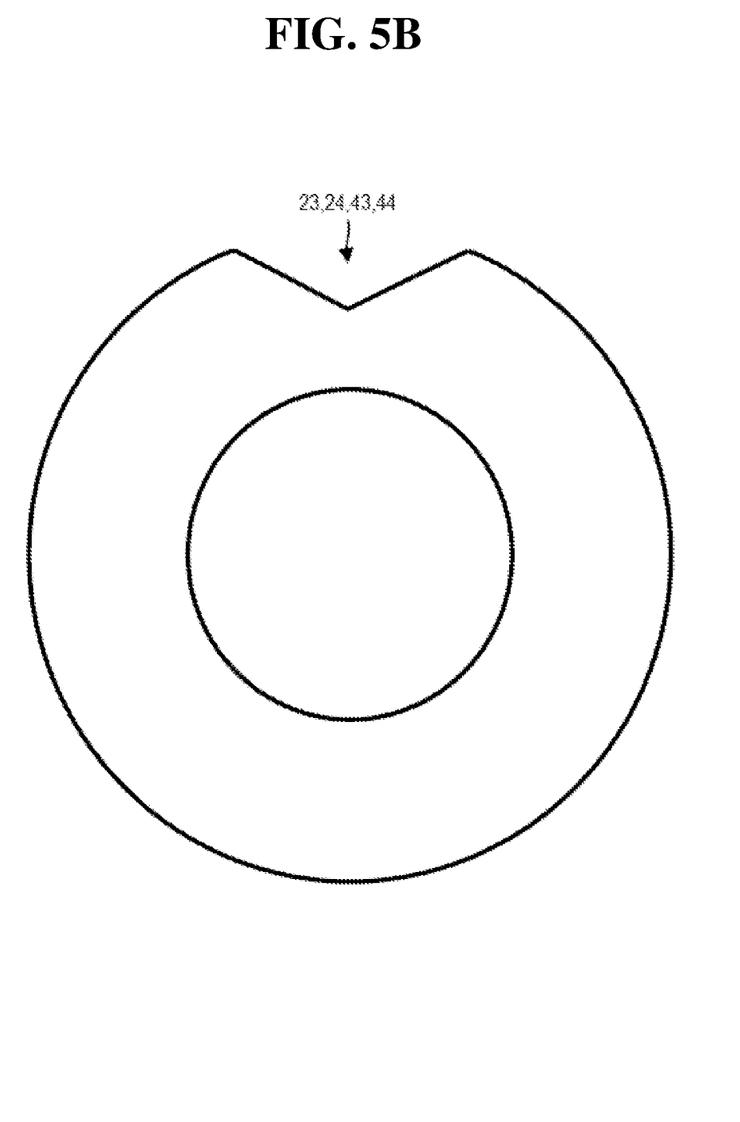
FIG. 5B depicts first and second ends of first and second inner walls of irrigation drip emitters of some other embodiments of the present invention.
Figure 5C:
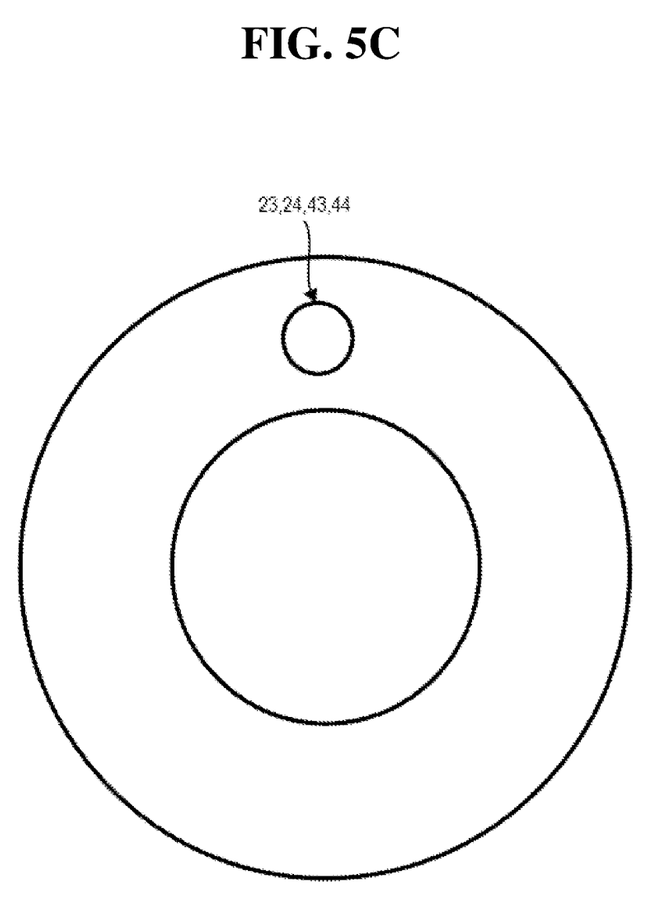
FIG. 5C depicts first and second ends of first and second inner walls of irrigation drip emitters of still some other embodiments of the present invention.

The shape, number, and size of the fluid passages (23, 24, 43, 44) can be, suitably, chosen depending on design needs as long as it facilitates the above-described fluid communication. The fluid passages can be formed in a round shape or a polygonal shape. As a non-limiting example, the fluid passages may be formed in an arc shape or rectangular shape, as illustrated in FIG. 3, FIG. 5A, and FIG. 5B. As another non-limiting example, the fluid passages may be formed in a round shape, as illustrated in FIG. 5C. Also, the fluid passages can be formed at an appropriate position of the first/second ends of the first/second inner walls. As a non-limiting example, the fluid passages may be formed in the midst of the first/second ends of the first/second inner walls, as illustrated in FIG. 5C.

Figure 6:
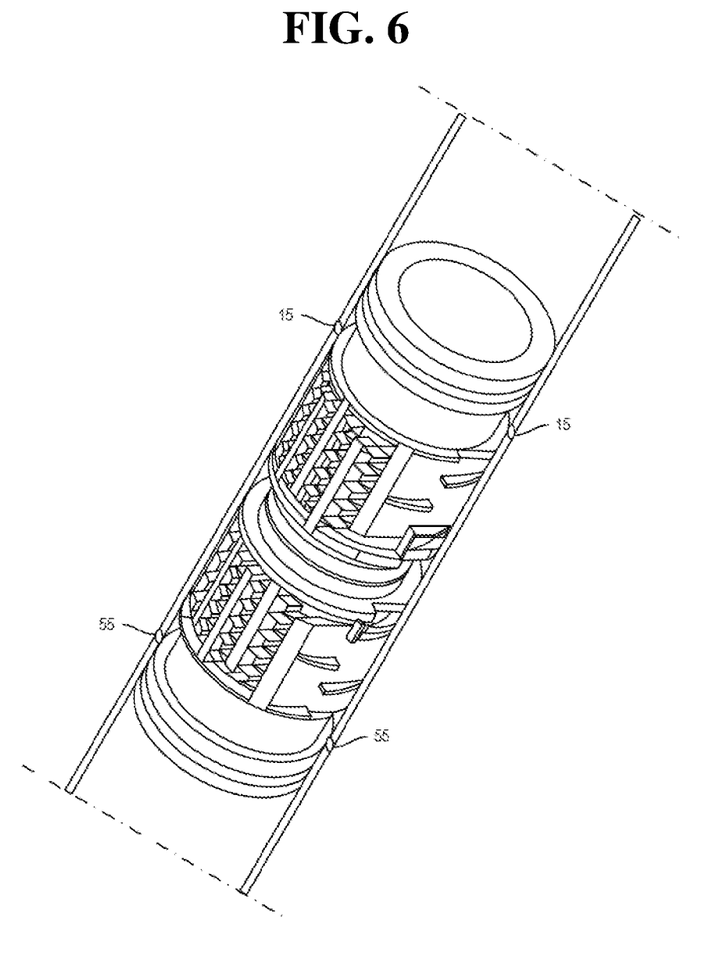
FIG. 6 depicts an irrigation line tube comprising an irrigation drip emitter.

Another aspect of the present invention provides an irrigation line tube comprising a plurality of irrigation drip emitters (1) of the present invention. An irrigation line tube (5) in accordance with some embodiments of the present invention has an outer surface, an inner surface, and dripping holes (15, 55) that penetrate the outer surface and the inner surface. A plurality of the irrigation drip emitters (1) according to embodiments of the present invention are provided in series inside the irrigation line tube (5) such that one or more of the dripping holes (55) are positioned above all or some of the first pools (10) of the irrigation drip emitters (1), one or more of the dripping holes (15) are positioned above all or some of the second pools (50) of the irrigation drip emitters (1), or both, as illustrated in FIG. 6.

Figure 8:
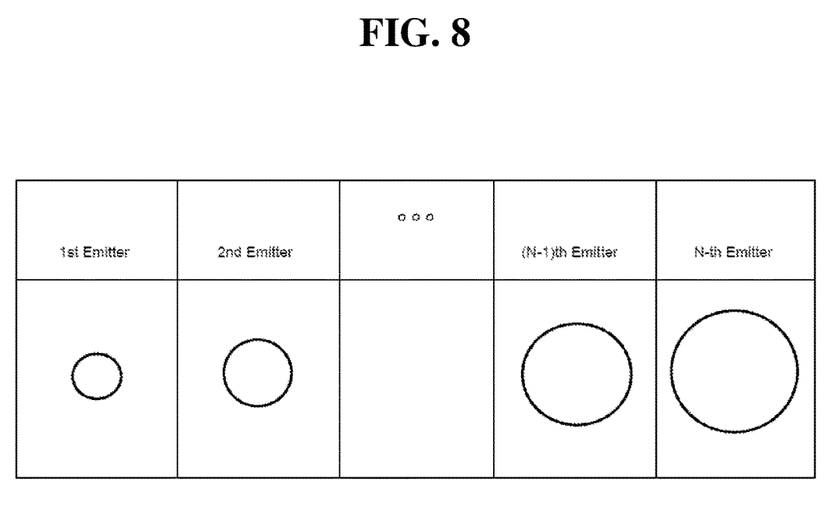
FIG. 8 illustrates cross-sectional areas of inner surfaces of irrigation drip emitters provided in an irrigation line tube, in accordance with some embodiments of the present invention.

In some embodiments, the area of cross-sections of the inner surfaces (300) of the irrigation drip emitters (1) may be designed to gradually increase as it goes from the first irrigation drip emitter (positioned at or near a first end of the irrigation line tube (5); e.g., the $1^{st}$ drip emitter of FIG. 8)

towards the last irrigation drip emitter (positioned at or near a second end of the irrigation line tube (5); e.g., the N-th drip emitter of FIG. 8)) provided in the irrigation line tube (5). Also, in some other embodiments, the area of cross-sections of the inner surfaces (300) of the irrigation drip emitters (1) may be designed to gradually decrease as it goes from the first irrigation drip emitter towards the last irrigation drip emitter provided in the irrigation line tube (5), although it is not illustrated in the drawings.

Figure 9A:
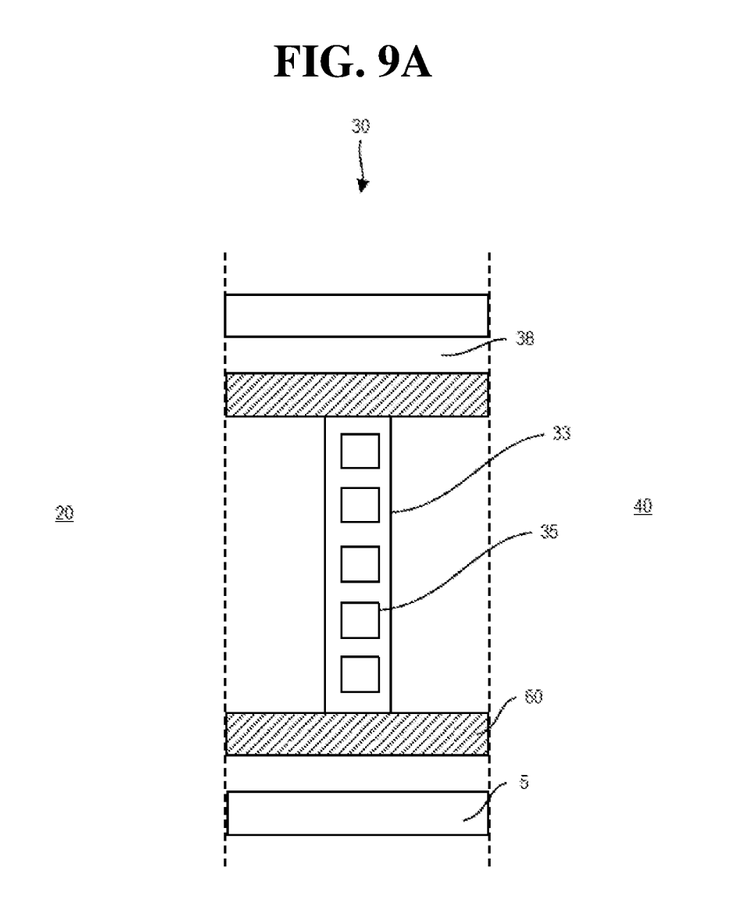
FIG. 9A is a plan view of an inlet recess of an irrigation drip emitter in accordance with some embodiments of the present invention in case where the elastic band of the irrigation drip emitter is at a closed position.
Figure 9B:
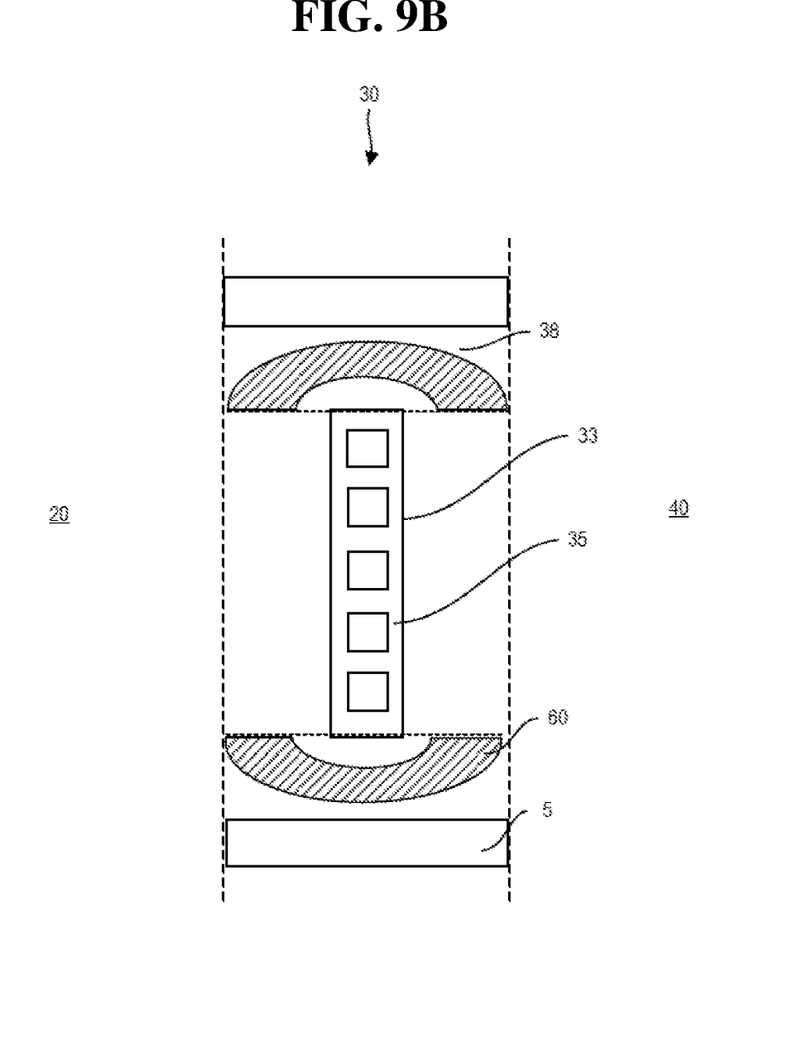
FIG. 9B is a plan view of an inlet recess of an irrigation drip emitter of FIG. 9A in case where the elastic band is at an open position.
Figure 10:
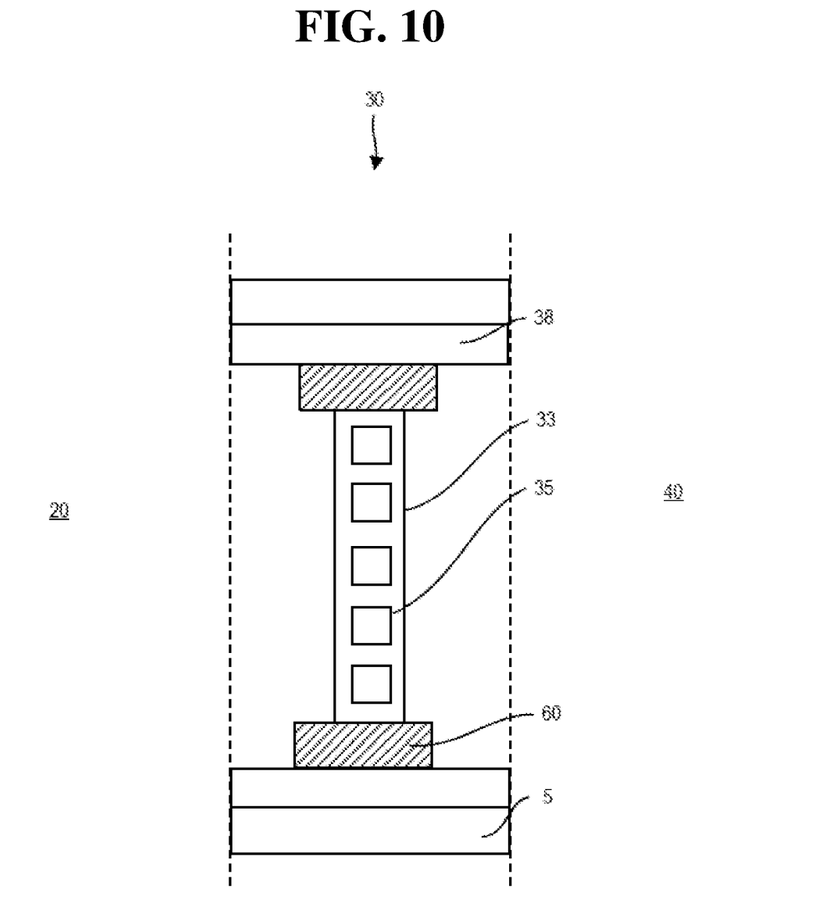
FIG. 10 is a plan view of an inlet recess of an irrigation drip emitter in accordance with some other embodiments of the present invention in case where the elastic band of the irrigation drip emitter is at a closed position.

As described above, the elastic band (60) is provided with the irrigation drip emitters (1) according to the embodiments of the present invention. The elastic band (60) can surround a part or all of the inlet recess (30). The inlet recess (30), as illustrated in FIG. 9A, FIG. 9B, and FIG. 10, may have inlet holes (35) arranged a single row (33). In some embodiments, the inlet recess (30) may have inlet holes arranged in two or more rows. In some other embodiments, the inlet recess (30) may have inlet holes arranged in an irregular pattern.

In some embodiments illustrated in FIG. 9A, the elastic band (60) covers all of the inlet recess (30). In this case, the elastic band (60) surrounds all of the inlet holes (35). In other embodiments illustrated in FIG. 10, the elastic band (60) covers a part of the inlet recess (30). In this case, the elastic band (60) surrounds a part or all of the inter holes (35), depending on the pattern in which the inlet holes (35) are provided in the inlet recess (30).

Figure 7:
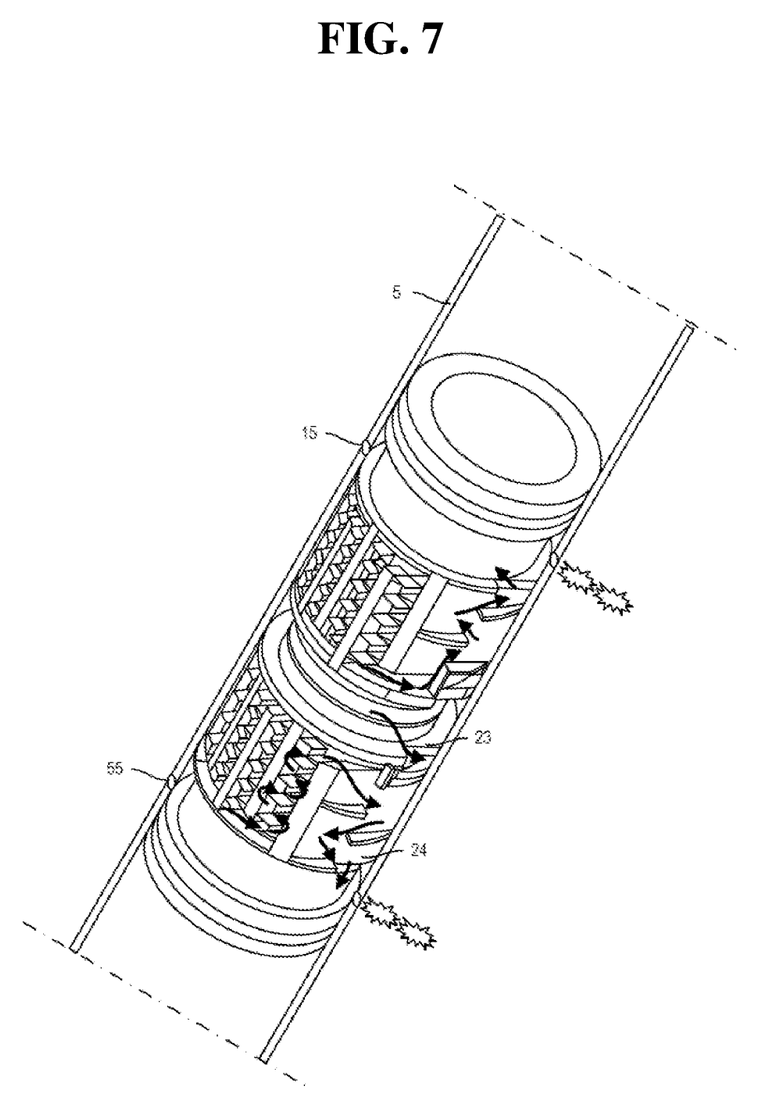
FIG. 7 depicts an irrigation line tube comprising an irrigation drip emitter and a fluid flow path thereof.

As described above, the elastic band (60) is configured to move between a closed position (FIG. 9A) and an open position (FIG. 9B). If a fluid pressure is not sufficient to expand the elastic band (60), the elastic band (60) is in a tight contact with the inlet holes (35) to thereby the fluid is prevented from flowing through the inlet holes (35). On the other hand, if a fluid pressure is sufficient to expand the elastic band (60) towards a space (38) defined by the elastic band (60) and the irrigation tube line (5), the elastic band (60) is expanded to thereby cause the fluid to flow to the inlet recess (30), then to the first and second labyrinth fluid flow paths (20, 40), then to the first and second pools (10, 50), and then through the dripping holes (55, 15), as illustrated in FIG. 7.

The present invention has been illustrated by the above embodiments, but it should be understood that the above embodiments are only for purposes of illustration and description, and are not intended to limit the invention within the scope of the embodiments described. Also skilled in the art will be appreciated that the present invention is not limited to the embodiments described above, in accordance with the teachings of the present invention can also make variations and modifications more of these variations and modifications are within the present invention as claimed.

The invention claimed is:

1. An irrigation drip emitter (1) comprising:
   a hollow body having a first end (100), a second end (500), an outer surface (200), and an inner surface (300);
   a first end wall (11) formed on the outer surface (200) at or near the first end (100);
   a second end wall (51) formed on the outer surface (200) at or near the second end (500);
   a first inner wall (21) formed on the outer surface (200) and having a first end (211) and a second end (212);
   a second inner wall (41) formed on the outer surface (200) and having a first end (411) and a second end (412);
   an inlet recess (30) defined by the outer surface (200), the second end (212) of the first inner wall (21), and the second end (412) of the second inner wall (41) and provided with one or more inlet holes (35) through which a fluid flowing along the inner surface (300) is configured to be supplied to the inlet recess (30);
   a first pool (10) defined by the outer surface (200), the first end wall (11), and the first end (211) of the first inner wall (21);
   a second pool (50) defined by the outer surface (200), the second end wall (51), and the first end (411) of the second inner wall (41); and
   an elastic band (60) surrounding at least one of the inlet holes (35) provided in the inlet recess (30),
   wherein the first inner wall (21) includes at least one vertical wall, at least one horizontal wall, or a combination thereof to define a first labyrinth fluid flow path (20),
   wherein the second inner wall (41) includes at least one vertical wall, at least one horizontal wall, or a combination thereof to define a second labyrinth fluid flow path (40),
   wherein a width of the first labyrinth fluid flow path (20) gradually increases as it goes from the second end (212) of the first inner wall (21) towards the first end (211) of the first inner wall (21),
   wherein a width of the second labyrinth fluid flow path (40) gradually increases as it goes from the second end (412) of the second inner wall (41) towards the first end (411) of the second inner wall (41), and
   wherein the elastic band (60) is configured to move between a closed position where the elastic band (60) is in a tight contact with the inlet holes (35) to prevent a fluid from flowing out of the inlet holes (35) and an open position where the elastic band (60) is expanded by a fluid flowing out of the inlet holes (35) to thereby allow the fluid to flow to the inlet recess (30).

2. The irrigation drip emitter of claim 1, wherein the first inner wall (21) includes at least one horizontal branch wall, at least one vertical branch wall, or a combination thereof.

3. The irrigation drip emitter of claim 1, wherein the second inner wall (41) includes at least one horizontal branch wall, at least one vertical branch wall, or a combination thereof.

4. The irrigation drip emitter of claim 1, wherein the first end (211) of the first inner wall (21) has one or more fluid passages (24), the second end (212) of the first inner wall (21) has one or more fluid passages (23), the second end (412) of the second inner wall (41) has one or more fluid passages (43), and the first end (411) of the second inner wall (41) has one or more fluid passages (44) such that the first and second pools (10, 50), the first and second labyrinth fluid flow paths (20, 40), and the inlet recess (30) are in fluid communication with each other directly or indirectly.

5. The irrigation drip emitter of claim 4, wherein at least one of the fluid passages is formed in the midst of the first end (211) of the first inner wall (21), the second end (212) of the first inner wall (21), the first end (411) of the second inner wall (41), the second end (412) of the second inner wall (41), or a combination thereof.

6. The irrigation drip emitter of claim 1, further comprising an additional first end wall (13) formed on the outer surface (200) at or near the first end (100), an additional second end wall (53) formed on the outer surface (200) at or near the second end (500), or both.

7. The irrigation drip emitter of claim 1, wherein the inlet holes (35) are formed in a single or multiple rows (33).

8. The irrigation drip emitter of claim 1, wherein the elastic band (60) surrounds some of the inlet holes (35).

9. An irrigation line tube (5) formed in a hollow body having a first end, a second end, an outer surface, and an inner surface, the irrigation line tube comprising:
- dripping holes (15, 55) penetrating the outer surface and the inner surface of the irrigation line tube; and
- a plurality of irrigation drip emitters provided in series inside the irrigation line tube, wherein each of the irrigation drip emitters comprises:
  - a hollow body having a first end (100), a second end (500), an outer surface (200), and an inner surface (300);
  - a first end wall (11) formed on the outer surface (200) at or near the first end (100);
  - a second end wall (51) formed on the outer surface (200) at or near the second end (500);
  - a first inner wall (21) formed on the outer surface (200) at or near the first end (211) and a second end (212);
  - a second inner wall (41) formed on the outer surface (200) and having a first end (411) and a second end (412);
  - an inlet recess (30) defined by the outer surface (200), the second end (212) of the first inner wall (21), and the second end (412) of the second inner wall (41) and provided with one or more inlet holes (35) through which a fluid flowing along the inner surface (300) is configured to be supplied to the inlet recess (30);
  - a first pool (10) defined by the outer surface (200), the first end wall (11), and the first end (211) of the first inner wall (21);
  - a second pool (50) defined by the outer surface (200), the second end wall (51), and the first end (411) of the second inner wall (41); and
  - an elastic band (60) surrounding at least one of the inlet holes (35) provided in the inlet recess (30),
  - wherein the first inner wall (21) includes at least one vertical wall, at least one horizontal wall, or a combination thereof to define a first labyrinth fluid flow path (20),
  - wherein the second inner wall (41) includes at least one vertical wall, at least one horizontal wall, or a combination thereof to define a second labyrinth fluid flow path (40), and
  - wherein the elastic band (60) is configured to move between a closed position where the elastic band (60) is in a tight contact with the inlet holes (35) to prevent a fluid from flowing out of the inlet holes (35) and an open position where the elastic band (60) is expanded by a fluid flowing out of the inlet holes (35) to thereby allow the fluid to flow to the inlet recess (30),
- wherein a cross-sectional area of an inner surface (300) of one of the irrigation drip emitters (1) is greater or small than a cross-sectional area of an inner surface (300) of another of the irrigation drip emitters (1) adjacent to the one of the irrigation drip emitters (1).

10. The irrigation line tube of claim 9, wherein cross-sectional areas of the inner surface (300) of the irrigation drip emitters (1) gradually increase or decrease as they go from the first irrigation drip emitter positioned at or near the first end of the irrigation line tube towards the last irrigation drip emitter positioned at or near the second end of the irrigation line tube.

11. An irrigation drip emitter (1) comprising:
- a hollow body having a first end (100), a second end (500), an outer surface (200), and an inner surface (300);
- a first end wall (11) formed on the outer surface (200) at or near the first end (100);
- a second end wall (51) formed on the outer surface (200) at or near the second end (500);
- a first inner wall (21) formed on the outer surface (200) and having a first end (211) and a second end (212);
- a second inner wall (41) formed on the outer surface (200) and having a first end (411) and a second end (412);
- an inlet recess (30) defined by the outer surface (200), the second end (212) of the first inner wall (21), and the second end (412) of the second inner wall (41) and provided with one or more inlet holes (35) through which a fluid flowing along the inner surface (300) is configured to be supplied to the inlet recess (30);
- a first pool (10) defined by the outer surface (200), the first end wall (11), and the first end (211) of the first inner wall (21);
- a second pool (50) defined by the outer surface (200), the second end wall (51), and the first end (411) of the second inner wall (41); and
- an elastic band (60) surrounding at least one of the inlet holes (35) provided in the inlet recess (30),
- wherein the first inner wall (21) includes at least one vertical wall, at least one horizontal wall, or a combination thereof to define a first labyrinth fluid flow path (20),
- wherein the second inner wall (41) includes at least one vertical wall, at least one horizontal wall, or a combination thereof to define a second labyrinth fluid flow path (40),
- wherein a width of the first labyrinth fluid flow path (20) gradually decreases as it goes from the second end (212) of the first inner wall (21) towards the first end (211) of the first inner wall (21),
- wherein a width of the second labyrinth fluid flow path (40) gradually decreases as it goes from the second end (412) of the second inner wall (41) towards the first end (411) of the second inner wall (41), and
- wherein the elastic band (60) is configured to move between a closed position where the elastic band (60) is in a tight contact with the inlet holes (35) to prevent a fluid from flowing out of the inlet holes (35) and an open position where the elastic band (60) is expanded by a fluid flowing out of the inlet holes (35) to thereby allow the fluid to flow to the inlet recess (30).

12. The irrigation drip emitter of claim 11, wherein the first inner wall (21) includes at least one horizontal branch wall, at least one vertical branch wall, or a combination thereof.

13. The irrigation drip emitter of claim 11, wherein the second inner wall (41) includes at least one horizontal branch wall, at least one vertical branch wall, or a combination thereof.

14. The irrigation drip emitter of claim 11, wherein the first end (211) of the first inner wall (21) has one or more fluid passages (24), the second end (212) of the first inner wall (21) has one or more fluid passages (23), the second end (412) of the second inner wall (41) has one or more fluid passages (43), and the first end (411) of the second inner wall (41) has one or more fluid passages (44) such that the first and second pools (10, 50), the first and second labyrinth fluid flow paths (20, 40), and the inlet recess (30) are in fluid communication with each other directly or indirectly.

15. The irrigation drip emitter of claim 14, wherein at least one of the fluid passages is formed in the midst of the first end (211) of the first inner wall (21), the second end (212) of the first inner wall (21), the first end (411) of the second inner wall (41), the second end (412) of the second inner wall (41), or a combination thereof.

16. The irrigation drip emitter of claim 11, further comprising an additional first end wall (13) formed on the outer surface (200) at or near the first end (100), an additional second end wall (53) formed on the outer surface (200) at or near the second end (500), or both.

17. The irrigation drip emitter of claim 11, wherein the inlet holes (35) are formed in a single or multiple rows (33).

18. The irrigation drip emitter of claim 11, wherein the elastic band (60) surrounds some of the inlet holes (35).

19. An irrigation drip emitter (1) comprising:
- a hollow body having a first end (100), a second end (500), an outer surface (200), and an inner surface (300);
- a first end wall (11) formed on the outer surface (200) at or near the first end (100);
- a second end wall (51) formed on the outer surface (200) at or near the second end (500);
- a first inner wall (21) formed on the outer surface (200) and having a first end (211) and a second end (212);
- a second inner wall (41) formed on the outer surface (200) and having a first end (411) and a second end (412);
- an inlet recess (30) defined by the outer surface (200), the second end (212) of the first inner wall (21), and the second end (412) of the second inner wall (41) and provided with one or more inlet holes (35) through which a fluid flowing along the inner surface (300) is configured to be supplied to the inlet recess (30);
- a first pool (10) defined by the outer surface (200), the first end wall (11), and the first end (211) of the first inner wall (21);
- a second pool (50) defined by the outer surface (200), the second end wall (51), and the first end (411) of the second inner wall (41); and
- an elastic band (60) surrounding at least one of the inlet holes (35) provided in the inlet recess (30),
- wherein the first inner wall (21) includes at least one vertical wall, at least one horizontal wall, or a combination thereof to define a first labyrinth fluid flow path (20),
- wherein the second inner wall (41) includes at least one vertical wall, at least one horizontal wall, or a combination thereof to define a second labyrinth fluid flow path (40),
- wherein the elastic band (60) is configured to move between a closed position where the elastic band (60) is in a tight contact with the inlet holes (35) to prevent a fluid from flowing out of the inlet holes (35) and an open position where the elastic band (60) is expanded by a fluid flowing out of the inlet holes (35) to thereby allow the fluid to flow to the inlet recess (30), and
- wherein the at least one vertical wall and the at least one horizontal wall of the first inner wall (21) include at least one vertical sub-wall and at least one horizontal sub-wall, or the at least one vertical wall and the at least one horizontal wall of the second inner wall (41) include at least one vertical sub-wall and at least one horizontal sub-wall.

\* \* \* \* \*